H. E. NILES.
PHOTOGRAPHIC PRINTING MASK.
APPLICATION FILED NOV. 22, 1907.

1,060,618.

Patented May 6, 1913.

Witnesses
Walter B. Payne
Russell B. Griffith

Inventor
Henry E. Niles
By Smith & Rich
his Attorneys

UNITED STATES PATENT OFFICE.

HENRY E. NILES, OF ROCHESTER, NEW YORK, ASSIGNOR TO EASTMAN KODAK CO., OF ROCHESTER, NEW YORK, A CORPORATION OF NEW YORK.

PHOTOGRAPHIC-PRINTING MASK.

1,060,618.  Specification of Letters Patent.  Patented May 6, 1913.

Application filed November 22, 1907. Serial No. 403,280.

*To all whom it may concern:*

Be it known that I, HENRY E. NILES, of the city of Rochester, in the county of Monroe and State of New York, have invented certain new and useful Improvements in Photographic-Printing Masks; and I do hereby declare the following to be a full, clear, and exact description of the same, reference being had to the accompanying drawings, forming a part of this specification, and to the reference-numerals marked thereon.

My present invention relates to photography and particularly to photographic printing in which operation the final record of the image is produced upon the sensitized sheet by exposure to light transmitted through the superposed negative and it has for its object to provide a simple, cheap and convenient device adapted to be interposed between the light and the sensitized sheet, and preferably between the negative and the sheet, which will produce an unexposed border on the latter inclosing a print of only such portion of the negative as it is desired shall appear in the photograph and render the latter, as a final product, trim and well balanced.

A further object of the invention is to also provide means which will aid the operator in trimming the picture to a regular shape and to a uniform width of border.

To these and other ends the invention consists in certain improvements and combinations of parts, all as will be hereinafter more fully described, the novel features being pointed out in the claims at the end of the specification.

Figure 1:
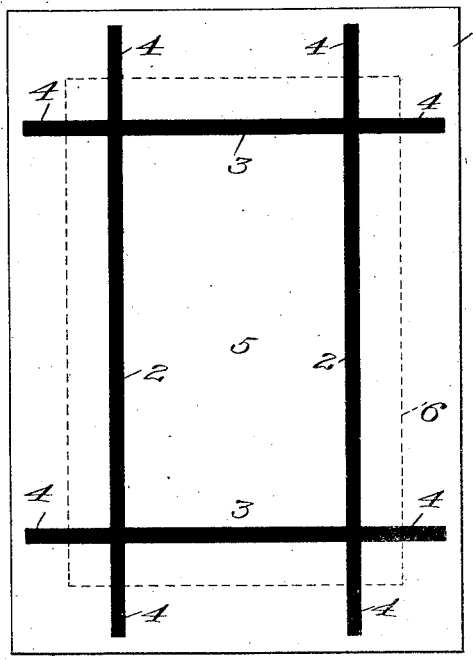
Figure 2:
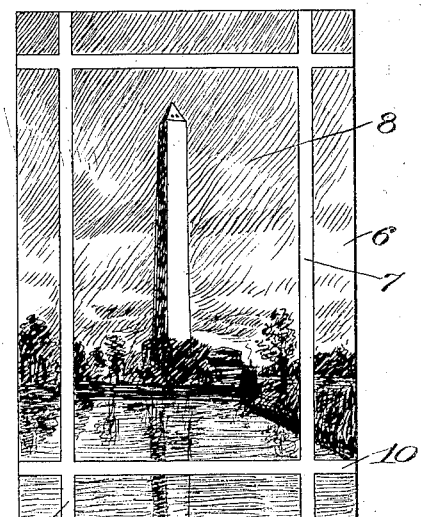
Figure 3:
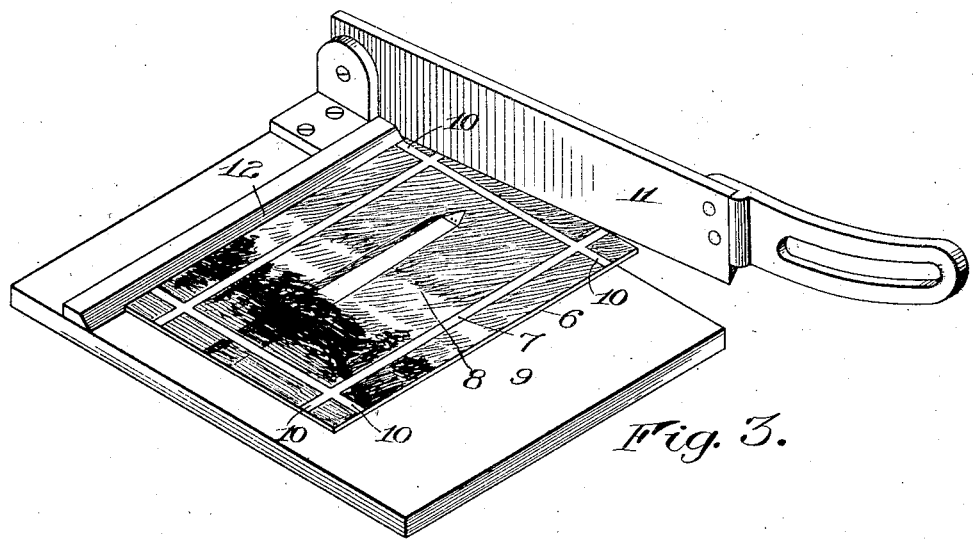

In the drawings: Figure 1 is a plan view of a mask constructed in accordance with my invention and illustrating an embodiment thereof. Fig. 2 is a similar view of the printed sheet and Fig. 3 is a perspective view of the latter upon a trimming board ready to be cut to proper size by the aid of the guide lines.

Similar reference numerals in the several figures indicate similar parts.

In making prints from photographic negatives it is often desired to preserve in the photograph only parts or single units appearing in a composite image and to cut out the remainder of the field of the negative at the same time providing a border on the print for that portion which is reproduced by protecting a strip around its margin from exposure to the light. In other cases it may be the object to cut out from the sensitized recording sheet, those portions of the field of the negatives produced by the marginal rays from the lens and which often appear ragged or out of focus. Again, if the image is found to be improperly positioned on the negative, portions thereof must be cut out or "masked" from the recording sheet and in every case a contrasting margin should be provided on the latter to give effect to the finished picture and render it neat and attractive. To these ends I provide a convenient form of mask which is superposed upon the sensitized sheet and which in addition to regulating the size and contour of the picture and providing a border around the same, also causes to be recorded upon the print, guiding marks intended to assist the operator in trimming the latter to regular proportions and the border to a uniform width.

Referring now to the drawings, in the embodiment shown, 1 indicates a sheet of translucent and preferably transparent and flexible material such as nitro-cellulose film cut to a size readily accommodated within the printing frame with which it is to be used and slightly larger than the sensitized recording sheet or printing paper as it is familiarly called. A central portion 5 of the sheet of a predetermined extent is inclosed by a preferably rectangular figure formed in the present instance by the parallel lines 2 and the parallel lines 3, intersecting the former at right angles, both pairs of lines being extended at 4 beyond their points of intersection. These lines are removed from the edges of the sheet and are composed of an opaque substance incorporated practically in the material of the latter to form a substantially integral part thereof. By this is meant that while they may be formed separately and superposed upon and united with the sheet they are preferably applied by printing or by an analogous process in order that the continuous, flat surface of the latter may be preserved. The inclosed space 5 governs the size of the picture and the width of the bordering lines regulates the depth of the border on the print.

In use, the mask is superposed upon the printing paper 6 (shown in dotted lines) substantially in the manner illustrated in Fig. 1, the latter being so arranged that the extended portions 4 of the opaque lines intersect its edges. The negative is next placed upon the mask and so arranged relatively thereto as to bring the portions of the image which are to form the picture over the portion 5 and the three elements are then placed in a frame and exposed in the ordinary manner. Corresponding portions of the paper protected by the opaque lines on the mask will be unexposed and form a white border 7 on the print surrounding the picture 8, the limits of the border as well as those of the picture being well defined and enabling the print to be easily trimmed to a regular form. When a trimmer similar to that illustrated in Fig. 3 and indicated by reference numeral 9 is employed, the extended portions 10 of the printed border line act as guides in the manner shown to start the cut of the knife 11. One edge, or the two opposite edges being properly cut in this way, those at right angles can be made true by placing the sheared edge against the guard 12 as will be understood. As the proper width of the border is exactly defined upon the print, the trimming operation is greatly simplified.

When the mask is made of transparent material it can be very easily positioned relatively to the printing paper while the contrast of its opaque lines is an aid toward arranging the negative thereon in such manner that the portions desired to be reproduced are properly alined within the border. It will be understood, however, that the mask and negative may, upon occasion, be interchanged.

I claim as my invention—

1. As an article of manufacture a mask for use in photographic printing comprising a sheet of material capable of transmitting light and adapted to be interposed between the negative and the sensitized recording surface, said sheet having incorporated in its structure as a substantially integral part thereof an opaque substance forming border lines removed from the edges of the sheet and inclosing a portion of the latter of a predetermined extent within which the photograph is to be included.

2. As an article of manufacture, a mask for use in photographic printing comprising a sheet of material capable of transmitting light and adapted to be interposed between the negative and the sensitized recording surface and having incorporated in its structure as a substantially integral part thereof, an opaque substance arranged to form a rectangular border line inclosing a portion of the sheet within which the photograph is to be included, the lines forming the adjacent sides of said border being extended beyond the point of intersection for the purposes described.

3. As an article of manufacture, a mask for use in photographic printing comprising a sheet of transparent material of uniform thickness adapted to be interposed between the negative and the sensitized recording surface and having incorporated in its structure as a substantially integral part thereof an opaque substance continuous with its surface and forming border lines of definite and uniform width removed from the edges of the sheet and inclosing a portion of the latter of a predetermined extent within which the photograph is to be included.

4. A photographic printing mask, consisting of a sheet having a border portion capable of preventing entirely the transmission of actinic rays, and a portion surrounding said border portion which permits the passage of actinic rays.

5. A photographic printing mask consisting of a sheet having a border portion and a surrounding portion, said border portion being capable of preventing the passage therethrough of actinic rays to a greater degree than the surrounding portion.

6. As an article of manufacture, a photographic printing mask embodying a sheet adapted to be inserted between the negative and sensitized material and comprising a central portion open to the passage of actinic rays of light and defining the picture area, a surrounding portion adapted to resist the passage of actinic rays to form a border on the print and portions for indicating on the print the trimming width of intersecting sides of the border adapted to resist the passage of actinic rays to a different degree from adjacent portions of the sheet, one such indicating portion being arranged in alinement with the outer or trimming edge of one side of the border and beyond the line of the corresponding edge of the other.

7. As an article of manufacture, a photographic printing mask embodying a sheet adapted to be inserted between the negative and sensitized surface and comprising a rectangular center portion open to the passage of actinic rays and defining the picture area, a surrounding portion adapted to resist the passage of actinic rays to form an unexposed border on the print and means on the sheet beyond the border at the corners thereof adapted to produce indicating marks on the print by the printing operation for guidance in subsequently trimming the border on the print to a predetermined width.

8. As an article of manufacture, a photographic printing mask embodying a sheet adapted to be inserted between the negative and sensitized surface and comprising a rectangular center portion open to the passage of actinic rays and defining the picture area, a surrounding portion adapted to resist the passage of actinic rays and form an unexposed border on the print and intersecting elongated portions on the sheet beyond the border at the corners thereof adapted to affect the passage of actinic rays to a different degree from surrounding portions for producing on the print guiding indications for trimming the print to a border of a predetermined width.

HENRY E. NILES.

Witnesses:
ALICE K. WHITNEY,
C. L. MAJOR.